United States Patent
Chen et al.

(10) Patent No.: US 8,605,113 B2
(45) Date of Patent: Dec. 10, 2013

(54) METHOD AND DEVICE FOR ADAPTIVE VIDEO PRESENTATION

(75) Inventors: Zhi Bo Chen, Beijing (CN); Xiao Dong Gu, Beijing (CN); Qu Qing Chen, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 660 days.

(21) Appl. No.: 12/310,461

(22) PCT Filed: Sep. 3, 2007

(86) PCT No.: PCT/CN2007/002632
§ 371 (c)(1),
(2), (4) Date: Feb. 25, 2009

(87) PCT Pub. No.: WO2008/040150
PCT Pub. Date: Apr. 10, 2008

(65) Prior Publication Data
US 2009/0244093 A1    Oct. 1, 2009

(30) Foreign Application Priority Data
Sep. 1, 2006  (WO) ................ PCT/CN2006/002261

(51) Int. Cl.
*G09G 5/00*    (2006.01)
(52) U.S. Cl.
USPC ............................ 345/620; 345/640; 345/660
(58) Field of Classification Search
USPC ......................................................... 345/620
See application file for complete search history.

(56) References Cited

U.S. PATENT DOCUMENTS

| | | | |
|---|---|---|---|
| 5,960,126 A | 9/1999 | Nielsen et al. | |
| 6,108,041 A * | 8/2000 | Faroudja et al. | 348/446 |
| 6,825,857 B2 | 11/2004 | Harasimiuk | |
| 6,928,186 B2 | 8/2005 | Ratnakar | |
| 7,035,435 B2 * | 4/2006 | Li et al. | 382/107 |
| 7,263,660 B2 * | 8/2007 | Zhang et al. | 715/723 |
| 7,505,051 B2 * | 3/2009 | Wang | 345/660 |
| 7,696,988 B2 * | 4/2010 | Wu et al. | 345/204 |

(Continued)

FOREIGN PATENT DOCUMENTS

| | | |
|---|---|---|
| CN | 1480901 | 3/2004 |
| CN | 1529499 | 9/2004 |

(Continued)

OTHER PUBLICATIONS

Fan et al. "Looking into Video Frames on Small Displays", ACM MM '03, 2003. pp. 247-250.*

(Continued)

*Primary Examiner* — Said Broome
*Assistant Examiner* — Peter Hoang
(74) *Attorney, Agent, or Firm* — Myers Wolin LLC

(57) ABSTRACT

An adaptive video presentation method for automatically presenting a video with stream-embed information based on content analysis of the video on a smaller display with a limited screen size is provided. The method comprises steps of determining a salient object group containing at least one salient object based on perceptual interest value of macroblocks for each frame of said video, extracting a window having a minimum size containing the salient object group for a scene of the video, characterized in that it further comprises steps of comparing size of the extracted window with the smaller display size; and presenting at least a selected area of the extracted window containing at least a part of the salient object group for the scene on the smaller display in different operation modes based on the result of the comparison steps for different motion mode for the scene of the video.

18 Claims, 3 Drawing Sheets

(56) References Cited

U.S. PATENT DOCUMENTS

| | | |
|---|---|---|
| 2003/0118100 A1 | 6/2003 | Honda et al. |
| 2005/0226538 A1 | 10/2005 | Di Federico et al. |
| 2006/0227153 A1* | 10/2006 | Anwar et al. ................. 345/660 |

FOREIGN PATENT DOCUMENTS

| CN | 1593065 | 3/2005 |
|---|---|---|
| JP | 2003199102 | 7/2003 |
| JP | 2005269016 | 9/2005 |
| JP | 2006196960 | 7/2006 |
| WO | WO03047266 | 6/2003 |
| WO | WO2004090812 | 10/2004 |

OTHER PUBLICATIONS

Search Report Dated Nov. 28, 2007.

* cited by examiner

METHOD AND DEVICE FOR ADAPTIVE VIDEO PRESENTATION

This application claims the benefit, under 35 U.S.C. §365 of International Application PCT/CN2007/002632, filed Sep. 3, 2007, which was published in accordance with PCT Article 21(2) on Apr. 10, 2008 in English and which claims the benefit of WO patent application No. PCT/CN2006/002261, filed Sep. 1, 2006.

FIELD OF THE INVENTION

The present invention relates to a method and a device for video presentation, and more particularly to a method and a device for adaptive video presentation on small displays.

BACKGROUND OF THE INVENTION

In the multimedia application area, a variety of new mobile devices, such as Pocket PC, Smartphone, SPOT watch, Tablet PC, personal digital assistant devices, etc, are growing popular in people's daily life. These devices are becoming more and more powerful in both numerical computing and data storage. Moreover, people have become enthusiastic to watch videos through these mobile devices.

However, low bandwidth connection and small display are still two serious obstacles that have undermined the usefulness of these devices in people's daily life. Though a few commercial video players such as Windows Media Player and PocketTV have been developed to enable users to browse videos from small-form factor devices, the limited bandwidth and small window size remain to be two critical obstacles. With the rapid and successful development of 2.5G and 3G wireless networks, the bandwidth factor is expected to be less constraint in the near future. While at the same time the limitation on display size is likely to remain unchanged for a certain period of time.

There has been some existing work focusing on the topic of displaying images on mobile devices. They can calculate and provide an optimal image viewing path based on the image attention model to simulate the human viewing behaviours. Since most of the valuable information is presented by videos, improving the experience of video viewing on small displays is very important to unleash the power of these mobile devices.

One solution to provide a better user experience for viewing videos on limited and heterogeneous screen size displays has been proposed by X. Fan et al in "Looking into Video Frames on Small Displays", ACM MM'03, 2003, which introduces three browsing methods: manual browsing method, full-automatic browsing method and semi-automatic browsing method.

However, in the proposed full-automatic browsing method, both direction and zoom controls are disabled. The resulting video stream uses more screen space to display the attention-getting regions while cropping out the other parts. Therefore this approach will have less difference with the conventional down-sampling scheme when video frames contain many separate focuses.

In the semi-automatic browsing method, human interaction is still required to switch the browsing focus when there is more than one important attention object (AO). The display focus is calculated after the user presses the control button, and the artefact will appear when the focus is changed.

Therefore, the existing schemes couldn't provide a good solution for automatically browsing videos on devices with small display size and keep a better tradeoff between video display quality and display size constraint, especially in multiple focuses cases.

SUMMARY OF THE INVENTION

The present invention provides an adaptive video presentation solution for full-automatically representing videos on display devices with small size according to metadata information based on content analysis in order to provide an optimal video viewing experience for users.

According to an aspect, an adaptive video presentation method for automatically presenting an original large size of video on a smaller display is provided, which comprises steps of determining at least one salient object group containing at least one salient object for each frame of the scene of the original large size of video, and presenting the determined at least one salient object group on the smaller display according to a function between a size related to the at least one salient object group and the size of the smaller display.

In an embodiment the size related to the at least one salient object group is the size of a rectangle that covers the at least one salient object group in the frame containing the at least one salient object group.

In another embodiment, presenting the at least one salient object group on the smaller display is further according to the motion vectors of all macroblocks inside the frame containing the at least one salient object group.

In a further embodiment, the at least one salient object group is presented on the smaller display in a low motion mode or a high motion mode according to a function between the length of the motion vectors of all the macroblocks inside the frame containing the at least one salient object group and a first threshold.

Advantageously, the at least one salient object group is presented on the smaller display in the low motion mode when the average length of the motion vectors of macroblocks inside the frame containing the at least one salient object group is less than the first threshold; otherwise presenting the at least one salient object group in the high motion mode.

Preferably when calculating the average length of the motion vectors of macroblocks inside the frame containing the at least one salient object group, the length of the motion vectors of the macroblocks in salient objects and other parts of the frame have different weights.

In an embodiment, the at least one salient object group is presented on the smaller display with the average point of all the gravity points of all frames in the scene being as the central point of the smaller display during the high motion mode.

Advantageously all the gravity points of all frames in the scene are weighted when calculating the average point.

In another aspect, during the high motion mode, if the size of the at least one salient group is less than a second threshold, the at least one salient object group is presented on the smaller display with a zoom-in operation; otherwise if the size of the at least one salient group is larger than a third threshold, the at least one salient object group is displayed on the smaller display with a zoom-out operation.

Preferably, the second threshold is less than a half of the size of the smaller display and the third threshold is larger than or equal to two times the size of the smaller display.

During the low motion mode, if the size of the at least one salient object group is less than a fourth threshold, the at least one salient object group is displayed on the smaller display with a zoom-in operation.

In still another aspect, during the low motion mode, if the size of the at least one salient object group is not less than the fourth threshold and is less than a fifth threshold, it will be displayed on the smaller display directly; otherwise, if the length of the original scene is not less than a sixth threshold, a pan operation is performed on the salient object group with the central point of the smaller display being following the movement of the gravity point of the salient object group.

During the low motion mode, if the length of the scene is larger than the seventh threshold, a zoom-out operation is performed on the salient object group.

In an embodiment, during the low motion mode, if the length of the scene is less than the sixth threshold and there is only one salient object in the salient group, the central point of the smaller display is following the movement of the gravity point of the salient object group with a zoom-out operation; otherwise the salient object group is displayed on the smaller display directly.

Preferably, the fourth threshold is not larger than the half of the smaller display and the fifth threshold is not smaller than the size of the smaller display.

In a further embodiment, a tolerance of gravity points between neighboring frames is used to remove dithering when the central point of the smaller display is following the movement of the gravity point of the salient object group. The tolerance of the change of the gravity points can be used in the horizontal direction and in the vertical direction.

An apparatus for automatically presenting an original large size of video on a smaller display is provided. The apparatus includes an object group classification module, which determines at least one salient object group containing at least one salient object for each frame of the scene of the video for presenting the at least one salient object group on the smaller display according to a function between a size related to the at least one salient object group and the size of the smaller display.

In an embodiment, the apparatus further comprises a content analysis module for extracting salient objects from the frames of the original video.

In another embodiment, the apparatus comprises a property calculation module which calculates the gravity point of each frame, weight of the gravity points of all frames in a scene, the weight of motion vectors of all macroblocks in a frame.

In still another embodiment, the apparatus comprises a still focus module which determines the area to be displayed on the smaller display.

In a further embodiment, the apparatus comprises a spatial-temporal processing module which smoothes and eliminates the artefacts of the image.

These and other aspects, features and advantages of the present invention will be described or become apparent from the following detailed description of the preferred embodiments, which is to be read in connection with the accompanying drawings.

DETAIL DESCRIPTION OF PREFERRED EMBODIMENTS

The present invention directs to a method and a device of adaptive video presentation (AVP) for better viewing experience with stream-embedded metadata base on content analysis information.

1. Introduction of basic Frameworks of AVP

Figure 1:
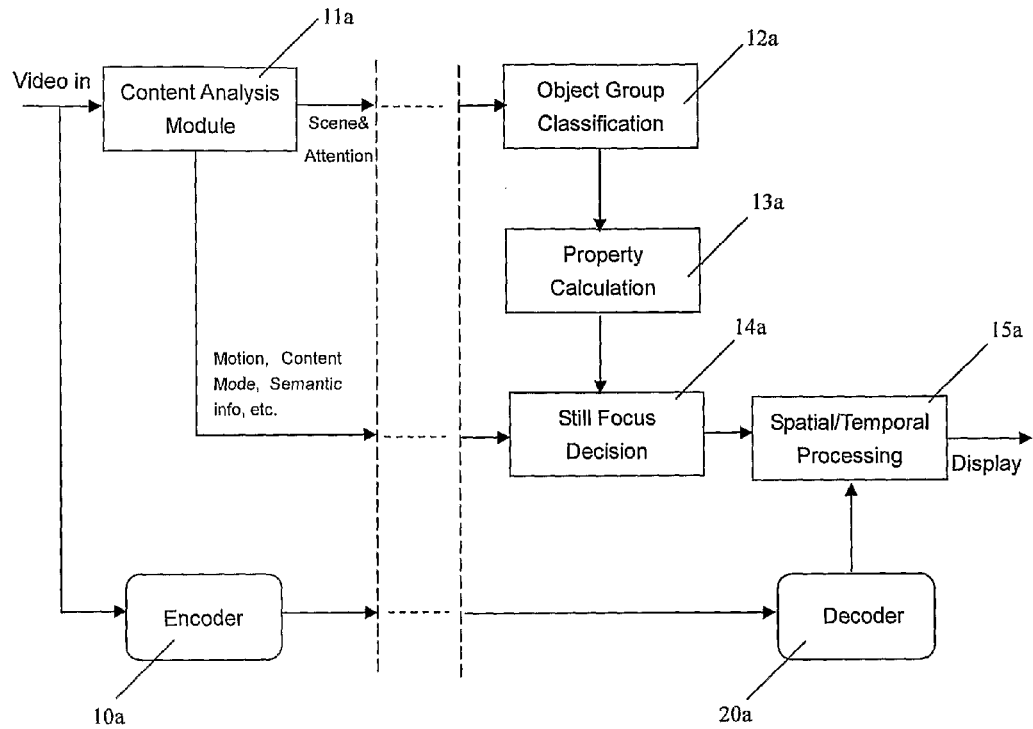
FIG. 1 is a schematic view of a first embodiment of the system framework using the method in accordance with the present invention.
Figure 2:
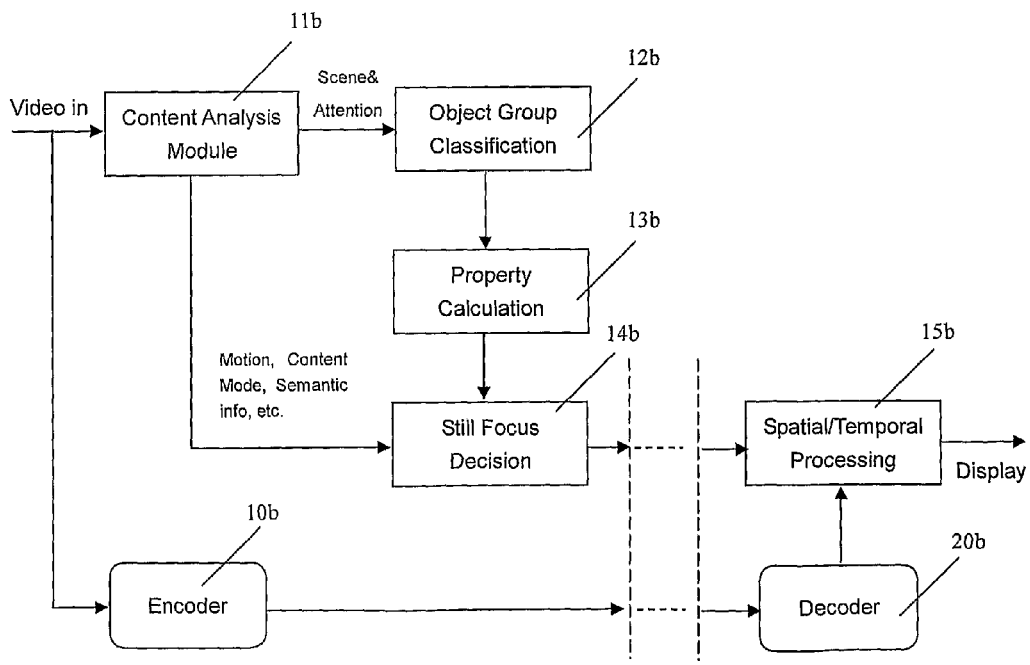
FIG. 2 is a schematic view of a second embodiment of the system framework using the method in accordance with the present invention.
Figure 3:
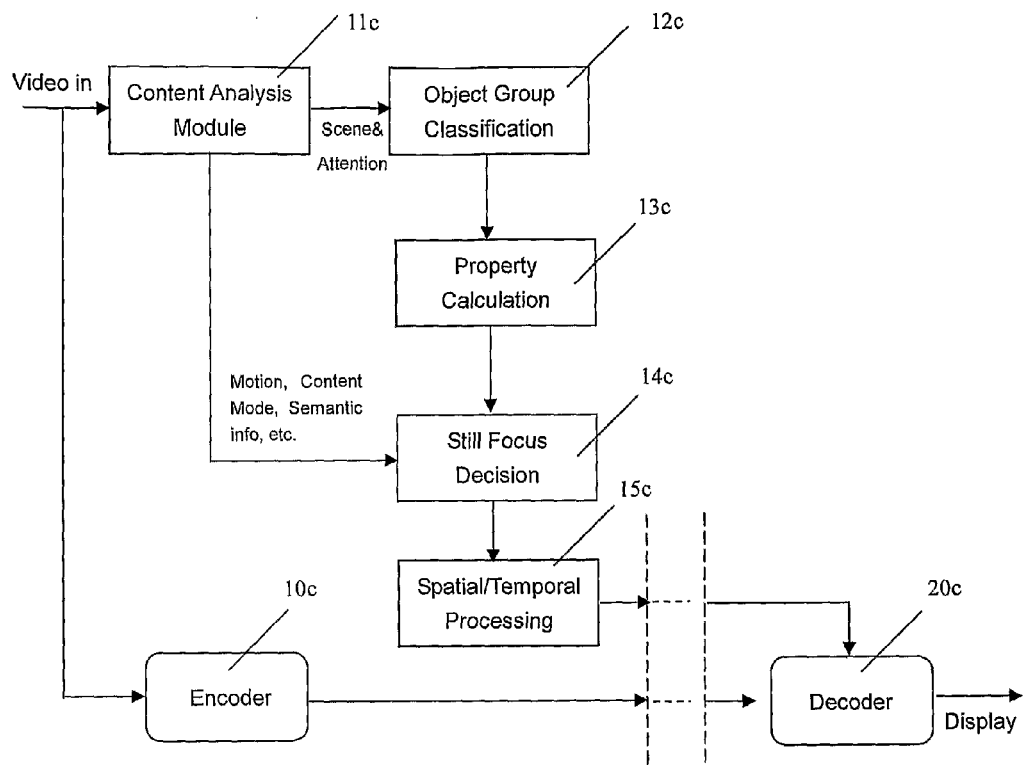
FIG. 3 is a schematic view of a third embodiment of the system framework using the method in accordance with the present invention.

As shown in FIGS. 1 to 3. The video with large resolution is processed by a pre-analysis module 11*a*, the object group classification (OGC) module 12*a*, the property calculation (PC) module 13*a*, a still focus decision (SFD) module 14*a*, and a spatial-temporal processing module 15*a*, and then the processed video is displayed on a smaller display.

According to the present invention, three types of AVP frameworks are proposed: decoder end solution, joint encoder-decoder end solution, and encoder end solution, as shown in FIGS. 1 to 3 respectively.

With reference to FIG. 1, the first type of the AVP framework solution leaves only a pre-analysis module 11*a* at the encoder end 10*a*, while leaves other four functional blocks at the decoder end 20*a*. The pre-analysis module 11*a* includes operations of scene change detection, attention area extraction and content/motion analysis. The content/motion analysis includes the salient object analysis and motion activity analysis or other semantic analysis. The other four functional blocks include an object group classification (OGC) module 12*a*, which classifies objects/object groups based on the scene and attention mask information from pre-analysis module 11*a*; a property calculation (PC) module 13*a*, which calculates statistics (e.g. gravity point of the salient object or salient object group, semantic weights, but not limited to) property of each salient object/object group; a still focus decision (SFD) module 14*a* which decides candidate focus area in special image based on the statistics information derived from PC module (e.g. gravity points) 13*a* and other metadata information from pre-analysis module 11; a spatial-temporal processing module 15*a*, which does a spatial-temporal processing to guarantee the video is smooth and acceptable and eliminates the artefacts. The operation of the spatial-temporal processing module 15*a* includes deciding the latest display area to be displayed on the smaller display with consideration of gravity flowing, direct display, saliency driving pan or true motion exhibition which will be introduced in the following paragraphs.

At first, the video displayed on the large display is processed by the pre-analysis module 11*a* to extract salient objects in each frame of the video, and then the extracted salient objects are grouped into at least one salient object group by the object classification (OGC) module 12*a*. The property calculation (PC) module 13*a* calculates the gravity point of each frame in a scene if the video, weights of the gravity point of each frame, weights of the motion vector of all macroblocks in a frame, etc. The still focus decision (SFD) module 14a decides the area to be displayed on a smaller display.

Similarly, in the second type of AVP framework solution as illustrated in FIG. 2, a pre-analysis module 11b, an object group classification module 12b, a property calculation module 13b and a still focus decision module 14b are included in the encoder end 10b to generate candidate focus area, and a spatial/temporal processing module 15b is included in a decoder end 20b to do optimal display based on candidate focus area with consideration of temporal and spatial quality tradeoff.

In the third type of AVP framework solution as illustrated in FIG. 3, all the modules of pre-analysis 11c, object group classification 12c, property calculation 13c, still focus decision 14c and spatial/temporal processing 15c are included in an encoder end 10c to generate the latest display area of each frame in a video sequence, and the metadata describing the suitable display area of each frame can be sent as embedded metadata to a decoder end 20c to help the adaptive display directly.

2. Introduction of Basic Definitions for Adaptive Video Presentation

To optimize the user's viewing experience on displays with small size display windows, a set of attention area blocks in video frames should be firstly considered to be displayed because the relative information has more positive contributions to the user's viewing experience. Some basic definitions for AVP are described as below.

A. Salient Object

Figures 4, 5:
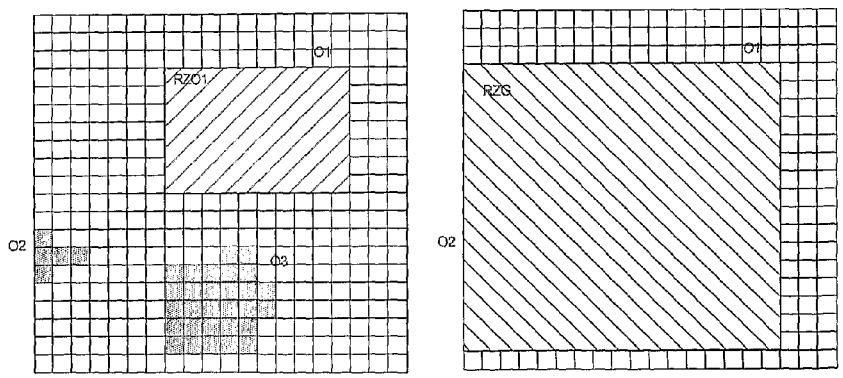
FIG. 4 is a schematic view of salient objects inside one frame.
FIG. 5 is a schematic view of salient object group inside one frame.

A Salient Object is a set of attention area MacroBlocks (MB) connected with each other, as shown by grey area of MBs in FIG. 4. The salient objects are separated by the non-attention MBs, which are denoted by white MBs.

A salient object $O_i$ (i=1, 2, 3, . . . , N) is described by following parameters:

| Name | Abbreviation | Description |
|---|---|---|
| Size | $SZ_i$ | The number of attention MBs included in the salient object $O_i$ |
| Contour | $CO_i$ | The minimum rectangle shape which contains the salient object $O_i$ |
| Rectangle Size of Object | RZO | Number of MacroBlocks included in the minimum rectangle shape which contains the salient object $O_i$, as shown by shadow area in FIG. 4 |
| Object Occupation Ratio | OOR | ($SZ_i$/RZO) × 100% |

B. Salient Object Group

A Salient Object group contains at least one salient Object. There can be several salient object groups in a frame. It can be described by following parameters:

| Name | Abbreviation | Description |
|---|---|---|
| Size | SZG | The number of attention MBs included in the salient object group |
| Contour | COG | The minimum rectangle shape which contains the salient object group |
| Rectangle Size of Object Group | RZG | Number of MacroBlocks included in the minimum rectangle shape which contains the salient object group, as shown by shadow area in FIG. 5 |
| Object Occupation Ratio | OOR | ($SZ_i$/RZO) × 100% |

C. Scene

A shot is a sequence of frames recorded in a single-camera operation. A scene is a collection of consecutive shots that have semantic similarity in object, person, space, and time. It's also defined to tell the switch of salient objects between two frames. The display scheme inside a scene should be definite and usually stays consistent.

One parameter defined for scene is:

| Name | Abbreviation | Description |
|---|---|---|
| Length Of Scene | LOS | Number of frames in one scene |

3. Introduction of Configuration Parameters and Operation Sets

Configuration parameters are necessary parameters to help making decisions of adaptive display mode selection, such as display or not, scaling down or not, summarizing or not, etc. There are four conditions defined to assist the video viewing path programming.

Minimum Perceptual Time (MPT)

MPT is used as a threshold for the fixation duration when viewing a salient object. If a salient object doesn't stay on the screen longer than a MPT threshold $MPT_{so}$, it may not be perceptible enough to let users catch the information. If a scene doesn't last longer than a threshold $MPT_{sc}$, only the most significant portion in it may be perceptible enough. $MPT_{so}$ and $MPT_{sc}$ can be selected according to different application scenarios and human visual property, which are usually set to ⅓ second and 2 second in our real application.

Minimum Perceptual Size (MPS)

The MPS is used as a threshold of the minimum spatial area of a salient object. Normally, if the size of a salient object $SO_i$ is less than a threshold $MPT_{so}$, the salient object $O_i$ should become marked as non-attention object or be merged into its neighbourhood salient object. But the MPS threshold is not always correct since a salient object with smaller spatial area may carry the most important information, and it cannot be merged or unmarked. So, some other semantic information will be used as additional configuration parameters of weight information, e.g. football, face, etc. Usually $MPT_{so}$ can be set to 5 MacroBlocks or be set to 5%-10% of the largest salient object size.

Weight of Salient Object (WSO)

This parameter is used to reserve the salient object that carries the most semantic important information and cannot be merged or unmarked. Normally, the value of each salient object's weight is set to 1. If a salient object obtains the most important information in the current and following frames (the number of frames should be larger than a threshold $T_{weight}$, usually $T_{weight}=10$) in a scene, its size is re-calculated as:

$$SO_i = SO_i \times WSO_i$$

Where $WSO_i$ can be defined by the semantic importance of each salient object, which is dependent on the content mode, third part's appointed semantic information, specifically user's experience, etc. Furthermore, the gravity of the salient object group is re-calculated.

Tolerance of Gravity Change (TGC)

When using gravity point of either salient object or salient object group of a frame as the center point of the smaller display. In order to avoid the dithering effect of the display which is caused by the slight change of the gravity point of the salient object or the salient object group between two neighboring frames, the parameter Tolerance of Gravity Change (TGC) is introduced to ensure that the small change of position (in unit of MarcoBlock) of gravity point will not cause the change of the center point of the smaller display. Two kinds of threshold $TGC_H$ (Tolerance of Gravity Change in the horizontal direction) and $TGC_V$ (Tolerance of Gravity Change in the vertical direction) can be defined according to the relationship between the smaller display screen and video frame size. When the change of gravity point (in unit of MacroBlock) is less than the two kinds of threshold $TGC_H$ and $TGC_V$ separately in horizontal and vertical direction, the center point of the display will not be changed to avoid dithering effect.

Table-I shows some operations needed for the requirement of adaptive video presentation.

TABLE I

Operations Set for Adaptive Video Presentation

| Operations | | Illustration |
|---|---|---|
| Low Motion Exhibition $((MV_{act} < T_{motion}))$ | Direct Display | Salient Objects or a salient object group is put on the smaller display screen directly |
| | Gravity Flowing Show | The movement of DA (Display Area) should be controlled following the movement of gravity point of an OG (Object Group), and usually TGC (Tolerance of Gravity Change) parameter should be used to keep a smooth display strategy |
| | Saliency Driving Pan | Pan operation with the consideration of saliency distribution to display the salient object on smaller display window, especially in case of large salient object or multiple salient objects existing |
| True Motion Exhibition $(MV_{act} >= T_{motion})$ | | Present all the salient object groups for a scene of the video with the weighted average gravity point as a still focus centre of the smaller display. |

According to the present invention, the adaptive video presentation operations can be classified into two categories: low motion exhibition and true motion exhibition respectively corresponding to low motion mode and high motion mode, which can be distinguished by the weighted average motion vector length of all MacroBlocks inside one frame $MV_{ACT}$. Usually a threshold $T_{MOTION}$ can be selected to do this classification, if $MV_{ACT}$ is less than $T_{MOTION}$, the low motion mode is determined, or else the high motion mode is determined.

In the low motion mode, there are at least three different exhibition operations can be used, i.e. direct display, gravity flowing show and saliency driving pan. Among these three operations, the direct display is to directly display the salient objects or salient object groups on the smaller display; the gravity flowing show controls the movement of display area of the smaller display by following the movement of the gravity point of the salient object group, and usually tolerance of gravity change (TGC) parameters are used to keep a smooth display strategy; the saliency driving pan is basically a pan operation with the consideration of saliency distribution to display the salient area on the smaller display window, especially in case of large salient object or multiple salient objects existing.

In the high motion mode, the true motion exhibition is introduced to display the salient objects or salient object group. The viewer can see the OG moving forwards and backwards on the smaller display window. In case of a scene of the video, the gravity point of each frame in the scene moves rapidly, and then the weighted average gravity point of all the frames in the scene of the video will be determined as the still focus centre of the smaller display. Thus the viewer can see the OG moving from one side to the other side of the smaller display window. For example, if the coordinates of the gravity point of all frames in the scene are recorded as (x1, y1), (x2, y2) . . . . Then the average of these gravity points should be x=average (x1, x2 . . . ), y=average (y1, y2 . . . ).

4. Decisions of Adaptive Video Presentation Operation

The video can be treated as an information gravity point flowing plane, in which different salient objects have different weights of importance of the information, and the MBs have the same characteristics inside each salient object. Therefore, it's the gravity point but not the center point of the salient object or group should be the center of the smaller display.

It can be imagined that there exists a kind of density distribution for the video content. The smaller display should focus on the area centralized by the gravity point of the group or a salient object, or progressively display the area by using the panning operation, which depends on the density distribution of the information.

The STP (spatial-temporal processing) module is the most important module in the AVP framework. Optimal spatial-temporal operations will be taken in the module to guarantee a smooth and acceptable video viewing experience.

Table-II demonstrates a sample of decisions of AVP operations, and of course some other types of combination can be considered due to detailed requirements of real application. In Table-II, DS means display size of the corresponding smaller display device.

TABLE II

Sample of decision of AVP operations

| Conditions | | AVP Operations | |
|---|---|---|---|
| | | Low Motion Mode ($MV_{ACT} < T_{MOTION}$) | High Motion Mode ($MV_{ACT} >= T_{MOTION}$) |
| RZG =< DS/n (e.g. n = 2, 3 . . . ) | | Direct Display + Zoom in | True Motion Exhibition + Zoom in |
| DS/n < RZG =< DS (e.g. n = 2, 3 . . . ) | | Direct Display | True Motion Exhibition |
| RZG >= DS | | Zoom out | True Motion Exhibition + Zoom out |
| LOS < MPT | | | |
| | One salient object | Gravity Flowing shown (with TGC limitation) + Zoom out | |
| | Multiple salient object | Direct Display (Pan is forbidden) | |
| LOS > m*MPT (e.g. m = 2, 3 . . . ) | | Gravity Flowing Show (with TGC limitation) + Saliency Driving Pan + Zoom out | |
| | Others | Gravity Flowing Show (with TGC limitation) + Saliency Driving Pan | |

Figure 6:
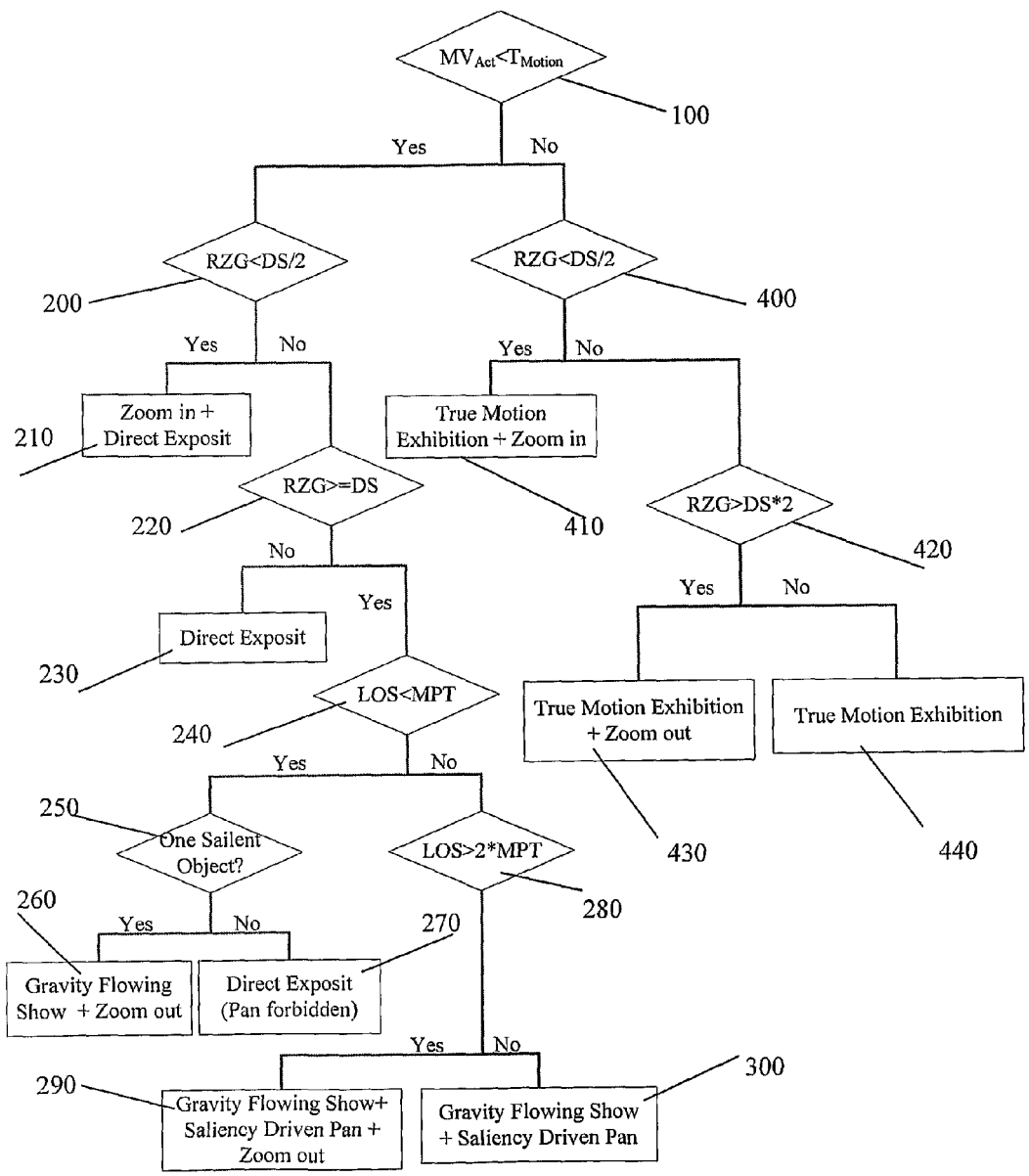
FIG. 6 is a flowchart of adaptive video presentation sample solution.

FIG. 6 demonstrates the flowchart of one exemplary scheme for decisions of the adaptive video presentation solution in accordance with the present invention.

For a scene of the video, salient objects should be extracted first. There are a lot of methods to do this work in the prior art, which will not be described here. Then at least one salient object group is determined. A salient object group contains at least one salient object.

In step 100, the motion mode of a scene of the video is determined by comparing the weighted average motion vector length for a frame $MV_{ACT}$ with the predefined threshold $T_{MOTION}$. In case the $MV_{ACT}$ is less than the predefined threshold $T_{MOTION}$, then the next step goes to step 200, or else to step 400. In step 200, it will determine whether the size of a minimum rectangle RGZ which covers the salient object group is equal or less than the DS/n, where n=2, 3 . . . , and preferably n=2. If it is determined in step 200 that the RZG is equal or less than the DS/n, then the process goes to step 210, where an extracted window with RZG are directly displayed on the smaller display with an appropriate zoom-in operation. If the RZG is equal or larger than the DS, then in step 220, it will determine whether the RZG is equal or larger than the DS, if the RZG is less than the DS but larger than the DS/n, then in step 230 the extracted window with the RZG will be directly displayed on the smaller display, if the RZG is larger than the DS, then in step 240, it will determine whether the length of scene LOS is less than the minimum perceptual time MPT. Then in step 250, it will determine whether the salient object group contains only one salient object. In a condition that only one salient object exists and the LOS is less than the MPT, the video will be presented on the smaller display in a gravity flowing shown operation with appropriate zoom-out operation, in step 260. In step 270, multiple salient objects exist and the LOS is less than the MPT, the video will be directly displayed on the smaller display, since in this condition the pan operation is forbidden to avoid frequent changing of the presentation operation so as to smooth the viewing experience. In step 280, it will determine whether the LOS is larger than m times of MPT, where m=2, 3 . . . . If the LOS is larger than m times of MPT, the video will be presented on the smaller display in a gravity flowing show operation along with a saliency driving pan operation and appropriate zoom-out operation, as in step 290. If the LOS is larger than MPT but not larger than m times of MPT, then the video will be presented in the gravity flowing show operation along with the saliency driving pan operation without zoom-out.

When the $MV_{ACT}$ is determined not less than the predefined threshold $T_{MOTION}$ in step 100, the process goes to step 400. In step 400, it is determined whether the RZG is less than the threshold DS/2. If the determination is 'yes', the process goes to step 410, where a true motion exhibition is done with a zoom-in operation. While if the determination of the step 400 is 'no', the process goes to step 420, where it is determined whether RZG is larger than 2DS. If the determination is 'yes' in step 420, the process goes to step 430, where a true motion exhibition is done with a zoom-out operation. If the determination of step 430 is 'no', the process goes to step 440, where the true motion exhibition is done.

Although the embodiment which incorporates the teachings of the present invention has been shown and described in detail herein, those skilled in the art can readily devise many other varied embodiments that still incorporate these teachings. It is noted that modifications and variations can be made by persons skilled in the art in light of the above teachings. It is therefore to be understood that changes may be made in the particular embodiments of the invention disclosed which are within the scope and spirit of the invention as outlined by the appended claims.

The invention claimed is:

1. An adaptive video presentation method for presenting a video of a first size on a display of a second size smaller than the first size, comprising:

determining a salient object group containing at least one salient object for each frame of a scene of the video, and displaying the at least one salient object in the determined salient object group on the display of the second size according to a function between a size related to the determined salient object group and the second size, calculating a gravity point of each frame inside one scene, gravity point of a salient object group, weight of the gravity points of all frames in a scene, the weight of motion vectors of all macroblocks in a frame, and a weighted average length of the motion vectors of macroblocks inside the frame containing the salient object group, the length of the motion vectors of the macroblocks in salient objects and other parts of the frame have different weights, wherein displaying the salient object group on the display of the second size in a low motion mode when a weighted average length of the motion vectors of macroblocks inside the frame containing the salient object group is less than a first threshold; otherwise displaying the salient object group in a high motion mode.

2. The method as claimed in claim 1, wherein for a frame, the size related to the salient object group is the size of a rectangle that covers the salient object group in the frame.

3. The method as claimed in claim 1, wherein displaying the salient object group on the display of the second size with the average point of gravity points of all frames in the scene being as the central point of the display of the second size during the high motion mode.

4. The method as claimed in dam 3, wherein during the high motion mode, if the size of the salient object group is less than a second threshold, displaying the salient object group on the display of the second size with a zoom-in operation; otherwise if the size of the salient group is larger than a third threshold, the salient object group is displayed on the display of the second size with a zoom-out operation.

5. The method as claimed in claim 4, wherein the second threshold is equal to a half of the second size and the third threshold is equal to two times the second size.

6. The method as claimed in claim 3, wherein the gravity points of all frames in a scene are dependent on at least one of: video content mode, and appointed semantic information.

7. The method as claimed in claim 1, wherein during the low motion mode, if the size of the salient object group is less than a fourth threshold, the salient object group is displayed on the display of the second size with a zoom-in operation.

8. The method as claimed in claim 1, wherein during the low motion mode, if the size of the salient object group is not less than a fourth threshold and is less than a fifth threshold, it will be displayed on the display of the second size directly; otherwise, if the length of the original scene is not less than a sixth threshold, a pan operation is performed over the salient objects in the salient object group with the central point of the display of the second size being following the movement of a gravity point of the salient object group, and if the length of the original scene is less than the sixth threshold and there is only one salient object in the salient object group, the central point of the display of the second size is following the movement of the gravity point of the salient object group with a zoom-out operation.

9. The method as claimed in claim 8, wherein during the low motion mode, if the length of the scene is larger than a seventh threshold, a zoom-out operation is performed on the salient object group.

10. The method as claimed in claim 1, wherein during the low motion mode, if the length of the scene is less than a sixth threshold and there is only one salient object in the salient group, the central point of the display of the second size is following the movement of the gravity point of the salient object group with a zoom-out operation; otherwise the salient object group is displayed on the display of the second size directly.

11. The method as claimed in claim 7, wherein the fourth threshold is equal to the half of the second size.

12. The method as claimed in claim 7, wherein a tolerance of gravity points between two neighboring frames is used to remove dithering when the central point of the display of the second size is following the movement of the gravity point of the salient object group.

13. The method as claimed in claim 12, wherein the tolerance of the change of the gravity points can be used in the horizontal direction and in the vertical direction.

14. An apparatus for presenting a video of a first size on a display of a second size smaller than the first size, comprising
an object group classification module, which determines a salient object group containing at least one salient object for each frame of a scene of the video for displaying the salient object group on the display of the second size according to a function between a size related to the determined salient object group and the second size, and
a property calculation module which calculates a gravity point of each frame inside one scene, gravity point of a salient object group, weight of the gravity points of all frames in a scene, the weight of motion vectors of all macroblocks in a frame,
wherein the property calculation module calculates a weighted average length of the motion vectors of macroblocks inside the frame containing the salient object group, the length of the motion vectors of the macroblocks in salient objects and other parts of the frame have different weights, and displays the salient object group on the display of the second size in a low motion mode when the weighted average length of the motion vectors of macroblocks inside the frame containing the salient object group is less than a first threshold; otherwise displays the salient object group in a high motion mode.

15. The apparatus as claimed in claim 14, further comprising a content analysis module for extracting salient objects from the frames of the original video.

16. The apparatus as claimed in claim 14, further comprising a still focus module which determines the area to be displayed on the display of the second size.

17. The apparatus as claimed in claim 16, further comprising a spatial-temporal processing module which smoothes and eliminates the artifacts of the image.

18. The method as claimed in claim 8, wherein the fifth threshold is equal to the second size.

* * * * *